(12) United States Patent
Serkh et al.

(10) Patent No.: US 11,028,884 B2
(45) Date of Patent: *Jun. 8, 2021

(54) ISOLATING DECOUPLER

(71) Applicant: Gates Corporation, Denver, CO (US)

(72) Inventors: Alexander Serkh, Troy, MI (US); Anthony R. Mora, Waterford, MI (US); Essie Rahdar, Costa Mesa, CA (US)

(73) Assignee: Gates Corporation, Denver, CO (US)

(*) Notice: Subject to any disclaimer, the term of this patent is extended or adjusted under 35 U.S.C. 154(b) by 234 days.

This patent is subject to a terminal disclaimer.

(21) Appl. No.: 16/040,751

(22) Filed: Jul. 20, 2018

(65) Prior Publication Data

US 2020/0025260 A1    Jan. 23, 2020

(51) Int. Cl.
| | |
|---|---|
| *F16D 7/02* | (2006.01) |
| *F02B 67/06* | (2006.01) |
| *F16D 3/12* | (2006.01) |
| *F16D 3/72* | (2006.01) |
| *F16D 41/20* | (2006.01) |
| *F16H 55/36* | (2006.01) |
| *F16H 55/56* | (2006.01) |
| *F16H 35/10* | (2006.01) |

(52) U.S. Cl.
CPC ............ *F16D 7/022* (2013.01); *F02B 67/06* (2013.01); *F16D 3/12* (2013.01); *F16D 3/72* (2013.01); *F16D 41/206* (2013.01); *F16H 55/36* (2013.01); *F16H 55/566* (2013.01); *F16D 2250/0076* (2013.01); *F16D 2300/22* (2013.01); *F16H 35/10* (2013.01); *F16H 2055/366* (2013.01)

(58) Field of Classification Search
CPC .... F16H 55/36; F16H 55/38; F16H 2055/363; F16H 2055/366; F16H 55/56; F16H 55/566; F16D 41/206; F16D 41/20; F16D 7/022; F16D 7/02; F16D 13/02; F16D 13/12; F16D 2250/0076; F16D 2300/22
See application file for complete search history.

(56) References Cited

U.S. PATENT DOCUMENTS

| | | |
|---|---|---|
| 6,083,130 A | 7/2000 | Mevissen et al. |
| 7,618,337 B2 | 11/2009 | Jansen et al. |
| 8,888,619 B2 | 11/2014 | Antchak et al. |
| 8,931,610 B2 | 1/2015 | Serkh |
| 9,033,832 B1 | 5/2015 | Serkh et al. |

(Continued)

FOREIGN PATENT DOCUMENTS

WO    2017121582 A1    11/2007

OTHER PUBLICATIONS

European Patent Office, International Search Report and Written Opinion of the International Searching Authority, International application No. PCT/US2019/042324, dated Oct. 7, 2019.

*Primary Examiner* — Michael R Mansen
*Assistant Examiner* — Raveen J Dias
(74) *Attorney, Agent, or Firm* — Alyssa K. Sandrowitz, Esq.

(57) ABSTRACT

An isolating decoupler comprising a shaft, a pulley journalled to the shaft on at least one bearing, a one-way clutch engaged with the shaft, a torsion spring engaged between the one-way clutch and the pulley, the shaft comprises an inner race of the at least one bearing, and the torsion spring having an end welded to the one-way clutch and having another end welded to the pulley.

9 Claims, 12 Drawing Sheets

(56) References Cited

U.S. PATENT DOCUMENTS

| | | |
|---|---|---|
| 9,181,989 B2 | 11/2015 | Mevissen et al. |
| 9,441,681 B2 | 9/2016 | Williams |
| 9,528,589 B2* | 12/2016 | Chang ................... F02B 67/06 |
| 9,651,099 B2 | 5/2017 | Antchak et al. |
| 9,682,621 B2 | 6/2017 | Dell et al. |
| 9,759,266 B1 | 9/2017 | Serkh et al. |
| 10,066,727 B2* | 9/2018 | Bourgeais ............... F16D 41/20 |
| 10,520,039 B2* | 12/2019 | Serkh ..................... F16H 55/36 |
| 2005/0250607 A1* | 11/2005 | Jansen ..................... F16D 3/72 474/74 |
| 2007/0254756 A1 | 11/2007 | Kawamoto et al. |
| 2010/0178990 A1* | 7/2010 | Jansen ..................... F16D 3/52 464/39 |
| 2011/0015018 A1* | 1/2011 | Yamatani ............... F16H 55/36 474/166 |
| 2011/0224038 A1* | 9/2011 | Aantchak ............... F16D 7/022 474/94 |
| 2012/0298474 A1* | 11/2012 | Ward ..................... F16D 41/206 192/41 S |
| 2013/0012346 A1* | 1/2013 | Sugitani ................. F16H 55/36 474/166 |
| 2013/0098733 A1 | 4/2013 | Antchak et al. |
| 2013/0237351 A1* | 9/2013 | Marion .................. F16H 55/36 474/70 |
| 2014/0008175 A1* | 1/2014 | Schneider .............. F16H 55/36 192/41 S |
| 2014/0141892 A1* | 5/2014 | Williams ................ F16D 13/76 464/40 |
| 2014/0305765 A1* | 10/2014 | Serkh ..................... F16H 55/36 192/41 S |
| 2014/0329631 A1* | 11/2014 | Mevissen ............... F16H 55/36 474/166 |
| 2015/0260265 A1* | 9/2015 | Agnitch ................... F16H 7/18 474/171 |
| 2015/0345575 A1* | 12/2015 | Antchak ................ F16D 43/24 474/94 |
| 2017/0298995 A1 | 10/2017 | Serkh et al. |
| 2017/0328443 A1* | 11/2017 | Serkh ..................... F16D 13/76 |
| 2020/0040947 A1* | 2/2020 | Ward ....................... F16D 3/12 |

\* cited by examiner

ISOLATING DECOUPLER

FIELD OF THE INVENTION

The invention relates to an isolating decoupler, and more particularly, to an isolating decoupler having a shaft comprising an inner race of at least one bearing, and a torsion spring having an end welded to a one-way clutch and having another end welded to a pulley.

BACKGROUND OF THE INVENTION

Diesel engine use for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range and to also control belt chirp.

Isolator decouplers are typically assembled with interference or press fits between components. In other cases mechanical connections are used, such as a tang engaged with a receiving groove. In still other cases some use of welding is known combined with use of discrete components. Components include bearings, pulleys and shafts.

Representative of the art is U.S. Pat. No. 9,759,266 which discloses an isolating decoupler comprising a shaft, a pulley journalled to the shaft, a torsion spring, the torsion spring comprising a flat surface planar in a plane normal to the rotation axis A-A on each end of the torsion spring, a one-way clutch engaged between the torsion spring and the shaft, a weld bead joining a torsion spring end to the one-way clutch, and a weld bead joining the other torsion spring end to the pulley.

What is needed is an isolating decoupler having a shaft comprising an inner race of at least one bearing, and a torsion spring having an end welded to a one-way clutch and having another end welded to a pulley. The present invention meets this need.

SUMMARY OF THE INVENTION

The primary aspect of the invention is an isolating decoupler having a shaft comprising an inner race of at least one bearing, and a torsion spring having an end welded to a one-way clutch and having another end welded to a pulley.

Other aspects of the invention will be pointed out or made obvious by the following description of the invention and the accompanying drawings.

The invention comprises an isolating decoupler comprising a shaft, a pulley journalled to the shaft on at least one bearing, a one-way clutch engaged with the shaft, a torsion spring engaged between the one-way clutch and the pulley, the shaft comprises an inner race of the at least one bearing, and the torsion spring having an end welded to the one-way clutch and having another end welded to the pulley.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
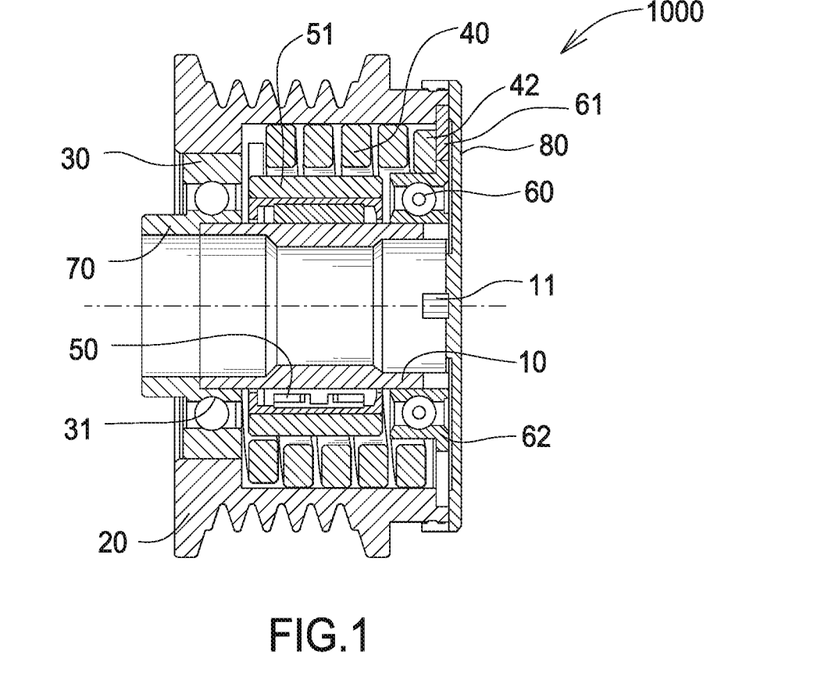
FIG. 1 is a cross section of a first embodiment.

FIG. 1 is a cross section of a first embodiment. Isolating decoupler 1000 comprises shaft 10, pulley 20, ball bearing 30, torsion spring 40, one-way clutch 50 and bearing 60. Ball bearing 30 may also comprise a needle bearing.

Pulley 20 is journalled to shaft 10 through bearing 30 and bearing 60. Torsion spring 40 is engaged between pulley 20 and one-way clutch carrier 51. Dust cover 80 prevents debris from entering the device.

An outer race 62 of bearing 60 comprises a radially extending flange 61. Flange 61 is welded to the outer race 62 and is also welded to pulley 20.

End 42 of torsion spring 40 is welded to flange 61. The other end 41 of torsion spring 40 is welded to clutch carrier 51. Clutch carrier 51 is press fit on one-way clutch 50. One-way clutch 50 is an anti-rotation feature that prevents rotation of the pulley in a predetermined direction while allowing rotation of the pulley in the opposite direction.

Receiving portion 11 is used to hold shaft 10 in a fixed position during assembly.

All embodiments have at least one of the bearings positioned inside the axial extent of the torsion spring envelope, for example, bearing 60 in this embodiment. This reduces the overall axial length of the device thereby facilitating use of the device in increasingly smaller engine compartments.

Figure 2:
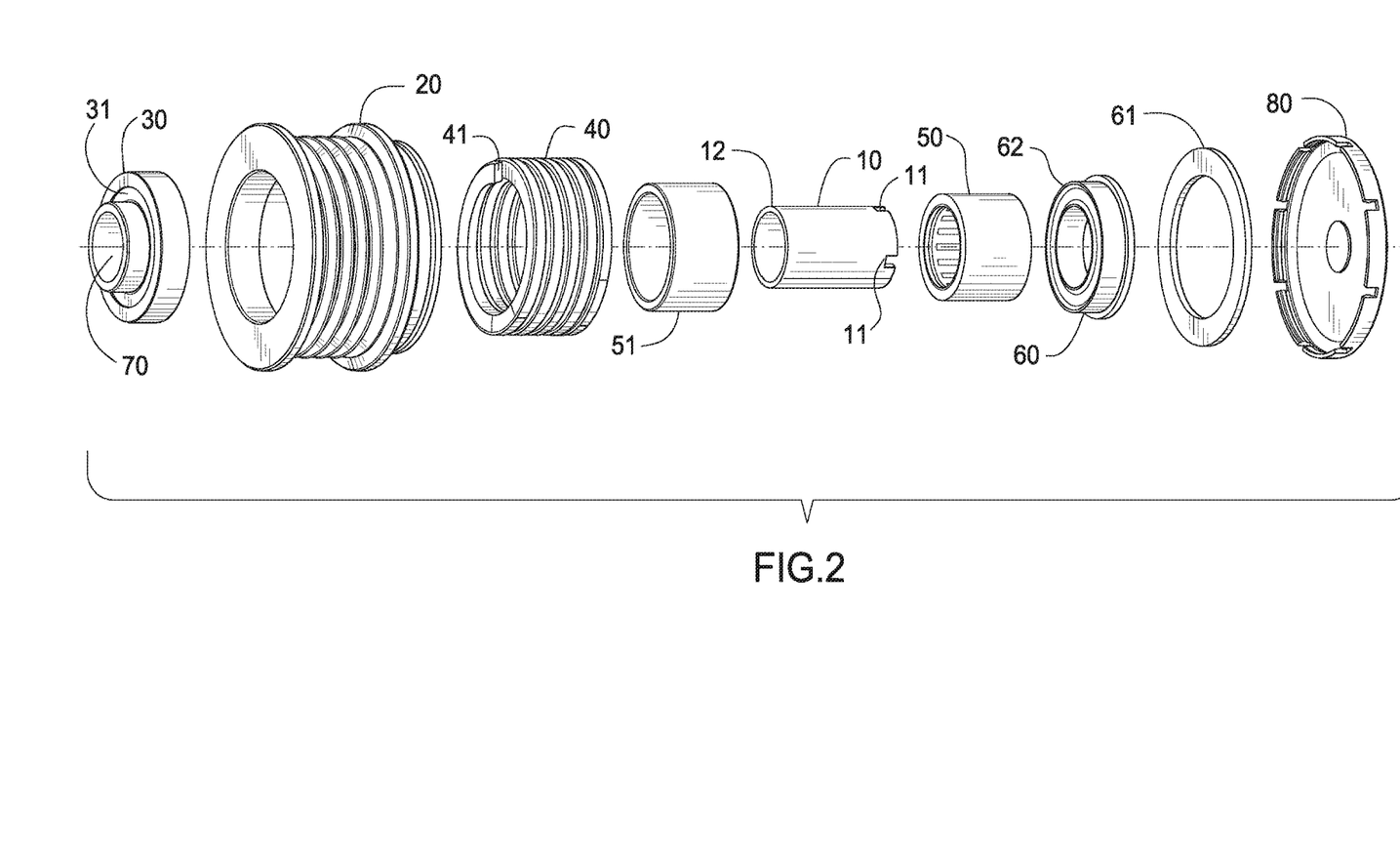
FIG. 2 is an exploded view of FIG. 1.

FIG. 2 is an exploded view of FIG. 1. End 41 of torsion spring 40 is welded to carrier 51. Inner race 31 of bearing 30 further comprises hub 70. Dust cover 80 covers an end of the device.

Hub 70 comprises both the inner race of bearing 30 as well as an extension of shaft 10. Hub 70 is press fit on one end 12 of shaft 10.

Figure 3A:
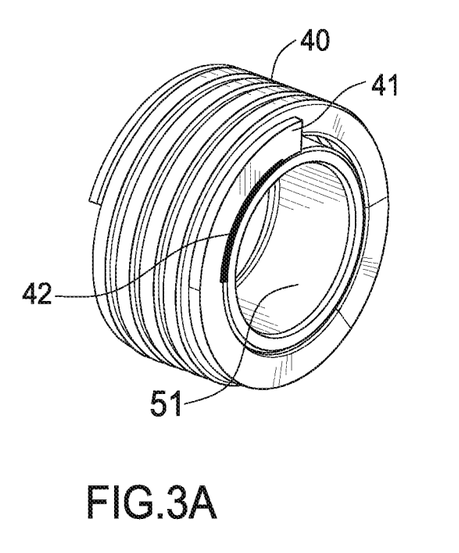
FIG. 3a is a perspective view of a weld detail.

FIG. 3a is a perspective view of a weld detail. Weld bead 42 attaches end 41 to carrier 51. The weld may be accomplished using methods known in the welding arts such as MIG, SMAW, GMAW, TIG and laser welding. Bead 42 extends through angle α of approximately 70 degrees in circumference, however, the length of the weld bead may vary between approximately 45 degrees and approximately 90 degrees depending on operational requirements.

Figure 3B:
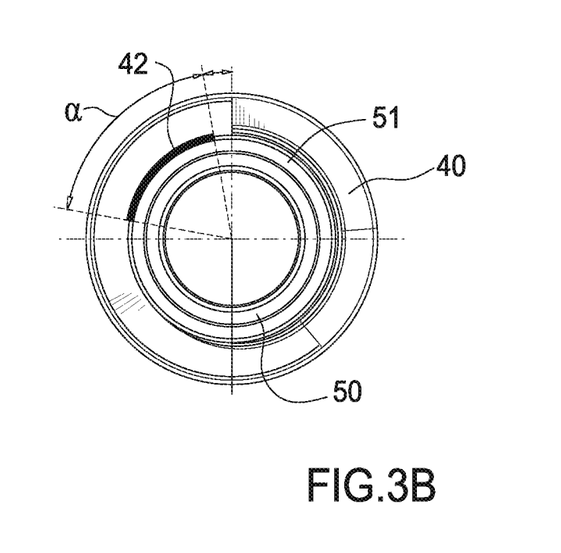
FIG. 3b is a front view of a weld detail.

FIG. 3b is a front view of a weld detail.

Figure 4A:
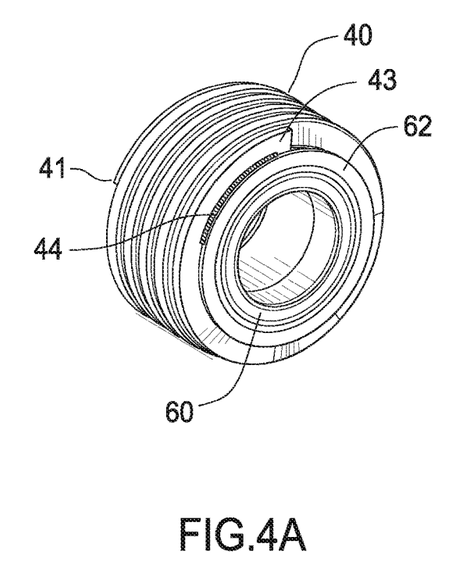
FIG. 4a is a perspective view of a weld detail.

FIG. 4a is a perspective view of a weld detail. Weld bead 44 attaches end 43 of torsion spring 40 to outer race 62. The weld may be accomplished using methods known in the welding arts such as MIG, SMAW, TIG and laser welding. Bead 44 extends through an angle α of approximately 70 degrees in circumference. However, the length of weld bead 44 may vary between approximately 45 degrees and approximately 90 degrees depending on operational requirements.

Figure 4B:
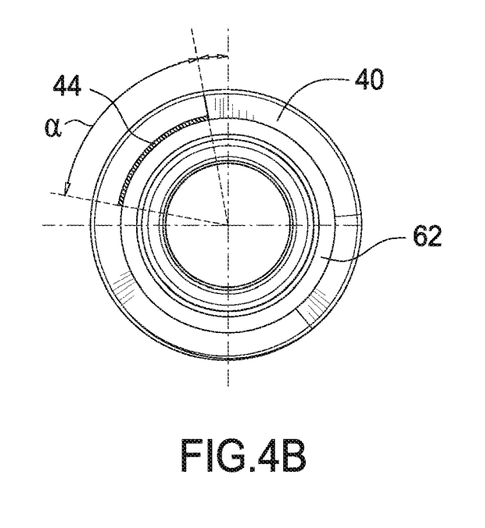
FIG. 4b is a front view of a weld detail.

FIG. 4b is a front view of a weld detail.

Figure 5:
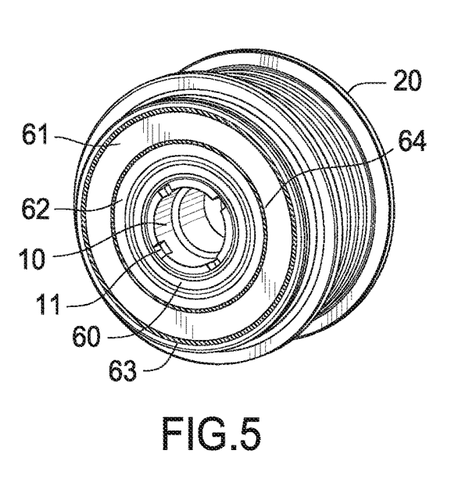
FIG. 5 is a perspective view of a weld detail.

FIG. 5 is a perspective view of a weld detail. Flange 61 is welded to pulley 20 and to bearing 60. Weld bead 63 welds flange 61 to pulley 20. Weld bead 64 welds flange 61 to outer race 62. Weld 63 and weld 64 may be accomplished using methods known in the welding arts such as MIG, SMAW, GMAW, TIG and laser welding. Weld bead 63 and weld bead 64 each extend around the full circumference of flange 61.

Figure 6:
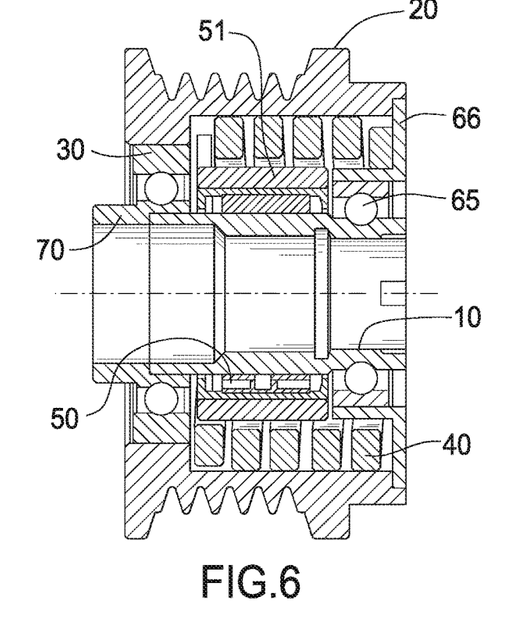
FIG. 6 is a cross-section view of a second embodiment.

FIG. 6 is a cross-section view of a second embodiment. In this embodiment the inner race of ball bearing 65 is an integral part of shaft 10.

"L" shaped flange 66 is press fit onto the outer race of bearing 65.

Figure 7:
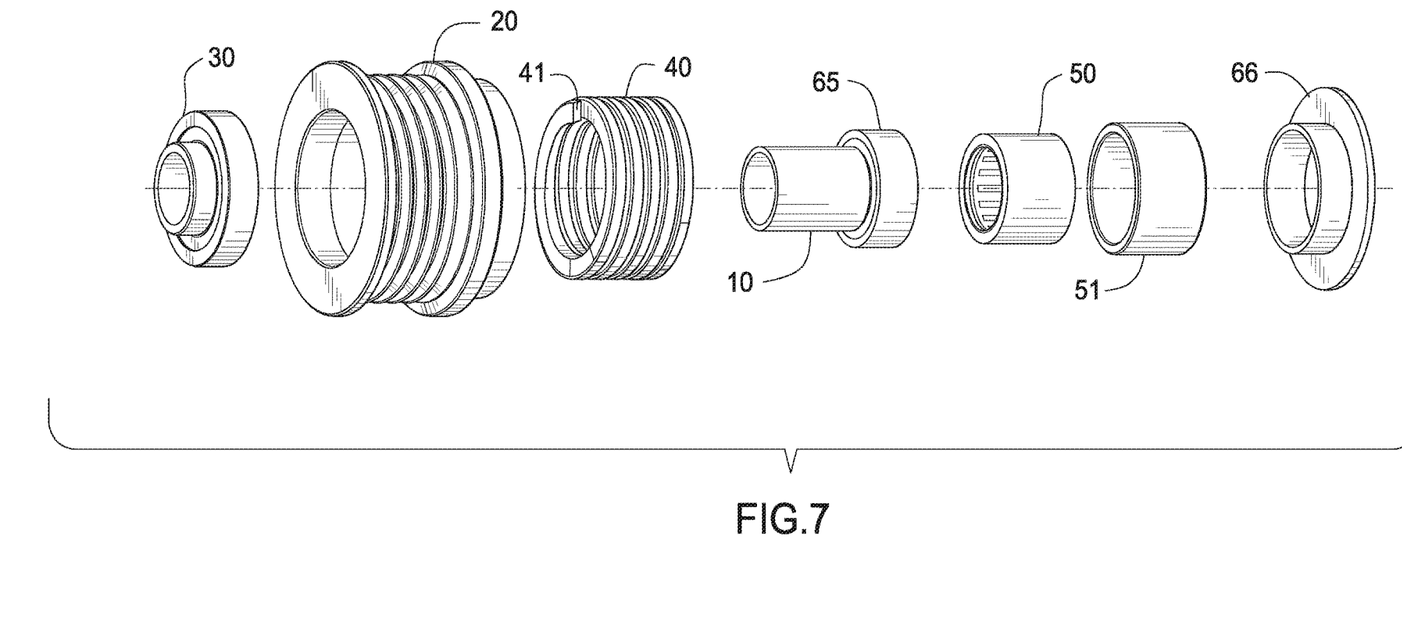
FIG. 7 is an exploded view of FIG. 6.

FIG. 7 is an exploded view of FIG. 6.

Figure 8A:
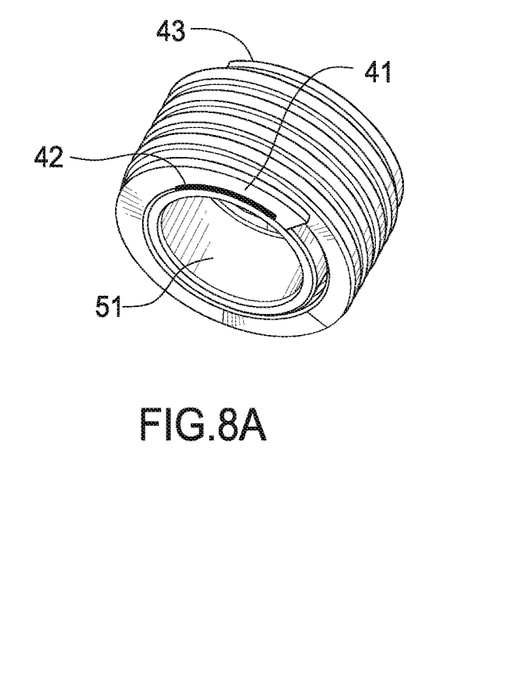
FIG. 8a is a perspective view of a weld detail.

FIG. 8a is a perspective view of a weld detail. Weld bead 42 attaches end 41 to carrier 51. Weld 42 may be accomplished using methods known in the welding arts such as MIG, SMAW, GMAW, TIG and laser welding. Bead 42 extends through an angle α of approximately 70 degrees in circumference, however, the length of the weld bead may vary between approximately 45 degrees and approximately 90 degrees depending on operational requirements.

Figure 8B:
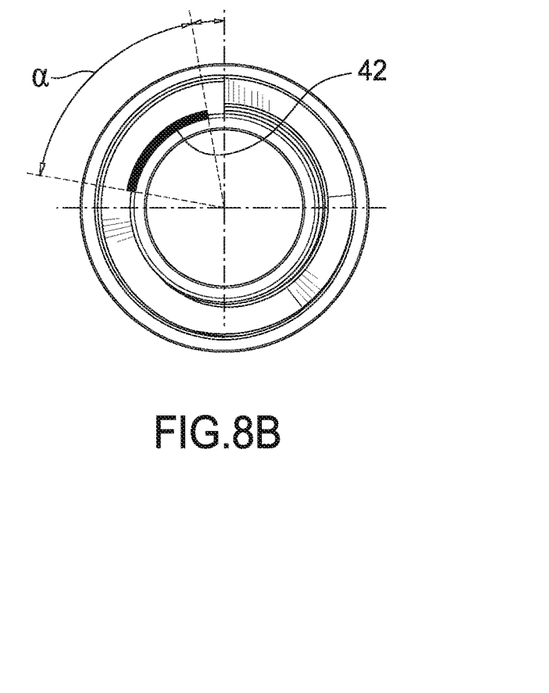
FIG. 8b is a front view of a weld detail.

FIG. 8b is a front view of a weld detail.

Figure 9A:
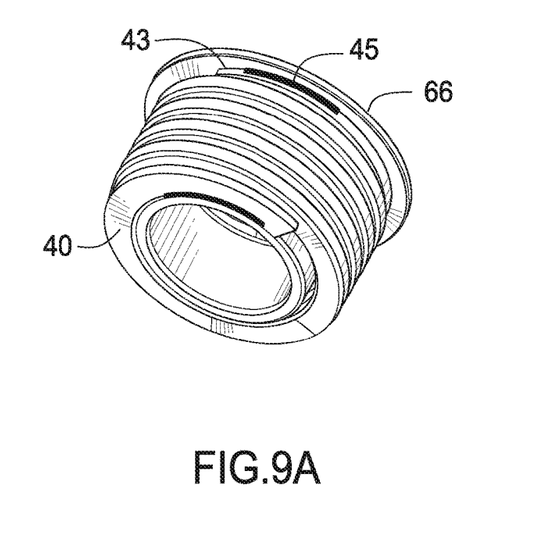
FIG. 9a is a perspective view of a weld detail.

FIG. 9a is a perspective view of a weld detail. Weld bead 45 attaches end 43 to outer flange 66. The weld may be accomplished using methods known in the welding arts such as MIG, SMAW, GMAW, TIG and laser welding. Weld 45 extends through approximately 70 degrees in circumference. However, the length of the weld bead may vary between approximately 45 degrees and approximately 90 degrees depending on operational requirements.

Figure 9B:
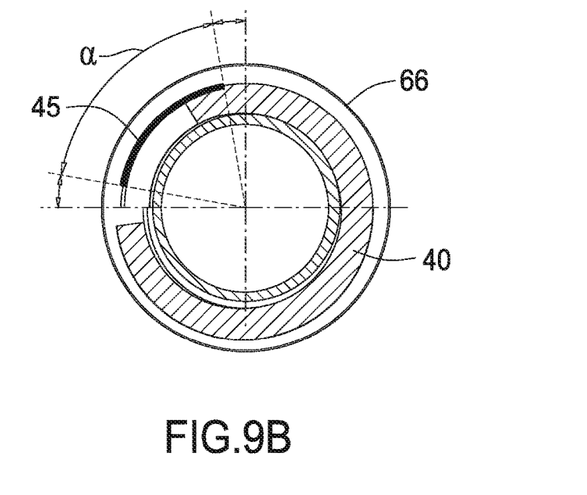
FIG. 9b is a front view of a weld detail.

FIG. 9b is a front view of a weld detail.

Figure 10:
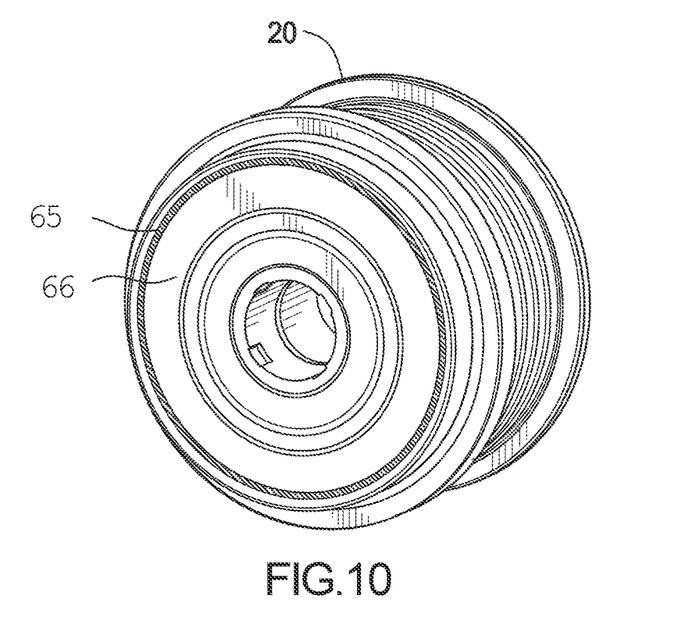
FIG. 10 is a perspective of a weld detail.

FIG. 10 is a perspective of a weld detail. Flange 66 is welded to pulley 20. Weld bead 65 welds flange 66 to pulley 20. Weld 65 may be accomplished using methods known in the welding arts such as MIG, SMAW, GMAW, TIG and laser welding. Weld 65 extends around the full circumference of flange 66.

Figure 11:
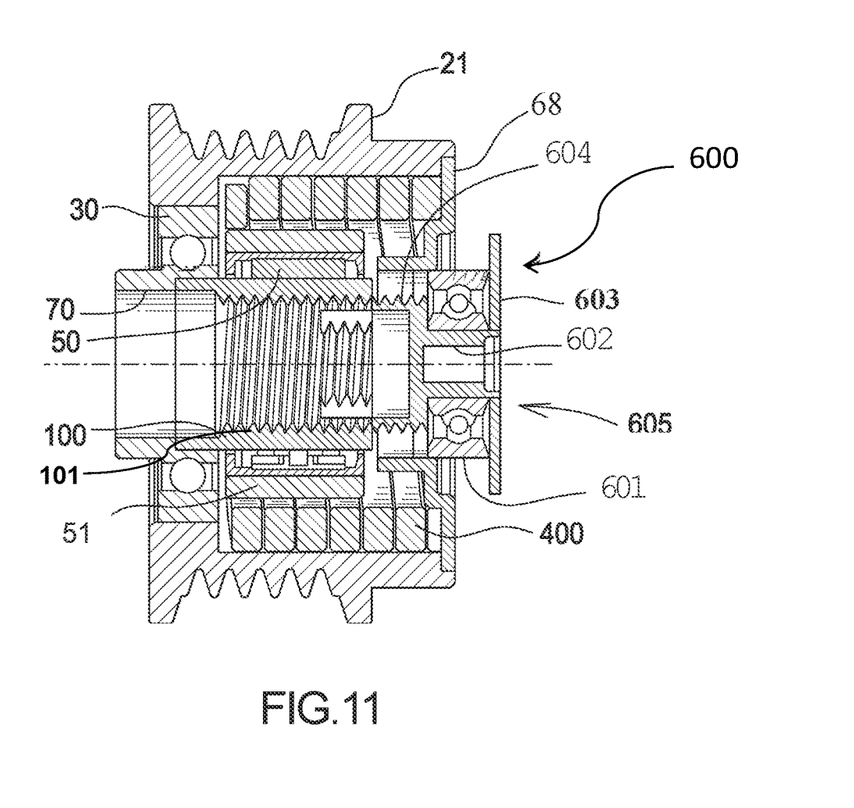
FIG. 11 is a cross-section view of a third embodiment.

FIG. 11 is a cross-section view of a third embodiment. In this embodiment bearing assembly 600 is threadably engaged with shaft 100. Torsion spring 400 is engaged between flange 68 and carrier 51. Pulley 21 is journalled to shaft 100 through bearing 30.

Bearing assembly 600 is threaded into shaft 100. Bearing assembly 600 comprises a bearing 601, carrier 602 and dust cover 603. Bearing 601 is press fit onto carrier 602. One end of carrier 602 comprises threaded projection 604. Threaded projection 604 engages threaded receiver 101 of shaft 100. A tool such as a ratchet (not shown) can engage portion 605 to screw bearing assembly 600 into shaft 100. Pulley 21 is journalled to shaft 100 on bearing 601.

Figure 12:
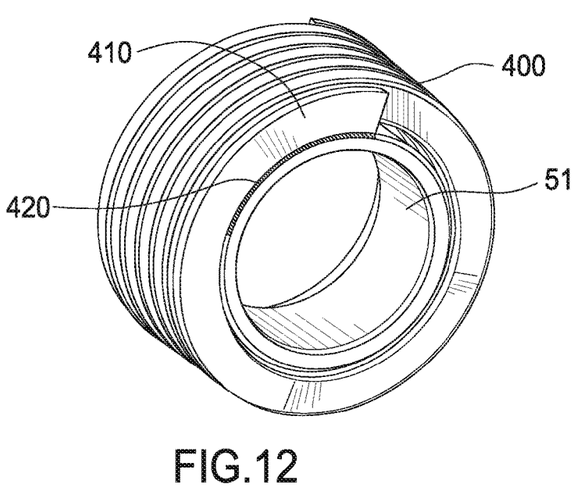
FIG. 12 is a perspective view of a weld detail.

FIG. 12 is a perspective of a weld detail. Weld bead 420 attaches end 410 to carrier 51. Weld 420 may be accomplished using methods known in the welding arts such as MIG, SMAW, TIG and laser welding. Weld 420 extends through approximately 70 degrees in circumference. However, the length of the weld bead may vary between approximately 45 degrees and approximately 90 degrees depending on operational requirements.

Figure 13:
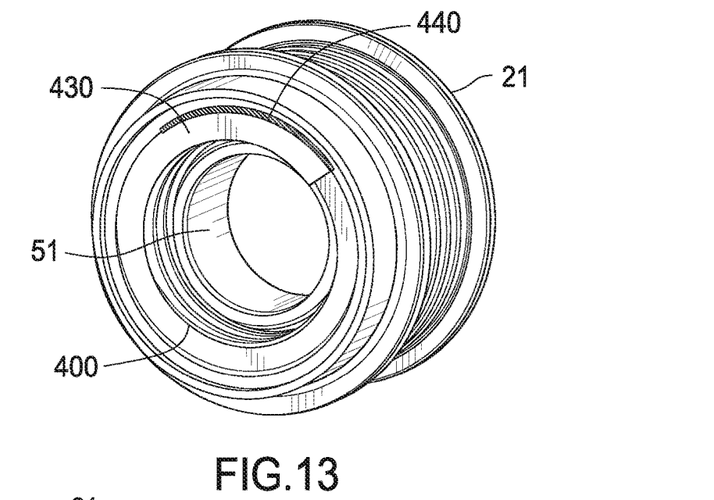
FIG. 13 is a perspective view of a weld detail.

FIG. 13 is a perspective of a weld detail. Weld bead 440 attaches end 430 to pulley 21. Weld 440 may be accomplished using methods known in the welding arts such as MIG, SMAW, TIG and laser welding. Weld 440 extends through approximately 70 degrees in circumference, however, the length of the weld bead may vary between approximately degrees and approximately 90 degrees depending on operational requirements.

Figure 14:
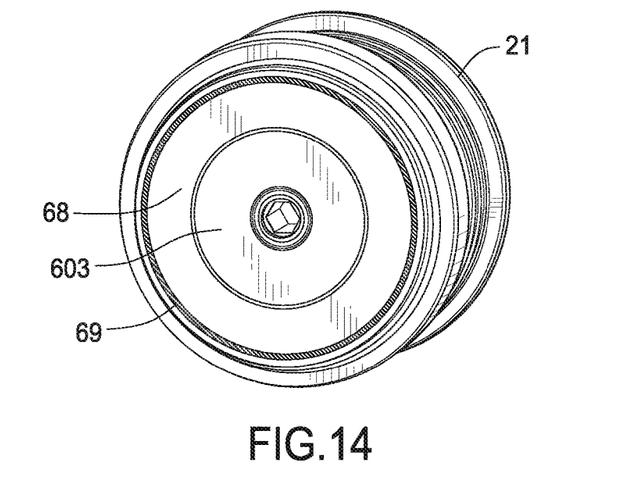
FIG. 14 is a perspective view of a weld detail.

FIG. 14 is a perspective of a weld detail. Flange 68 is welded to pulley 21. Weld bead 69 welds flange 68 to pulley 21. Weld 69 may be accomplished using methods known in the welding arts such as MIG, SMAW, GMAW, TIG and laser welding. Weld 69 extends around the full circumference of flange 68.

Figure 15:
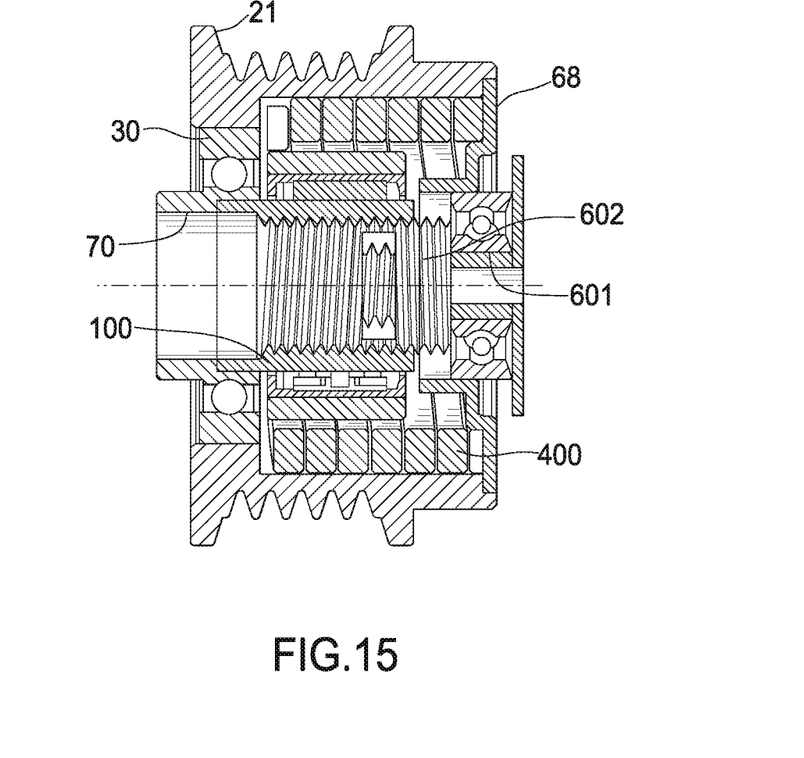
FIG. 15 is a cross-section view of the third embodiment.

FIG. 15 is a cross-section view of the third embodiment. There is a clearance fit between bearing 601 and flange 68 which allows bearing 601 to slide into flange 68 during assembly.

Welded assembly of the components torsion spring 400, carrier 51, flange 68 and pulley 21 are as described elsewhere in this specification for the other embodiments.

Figure 16A:
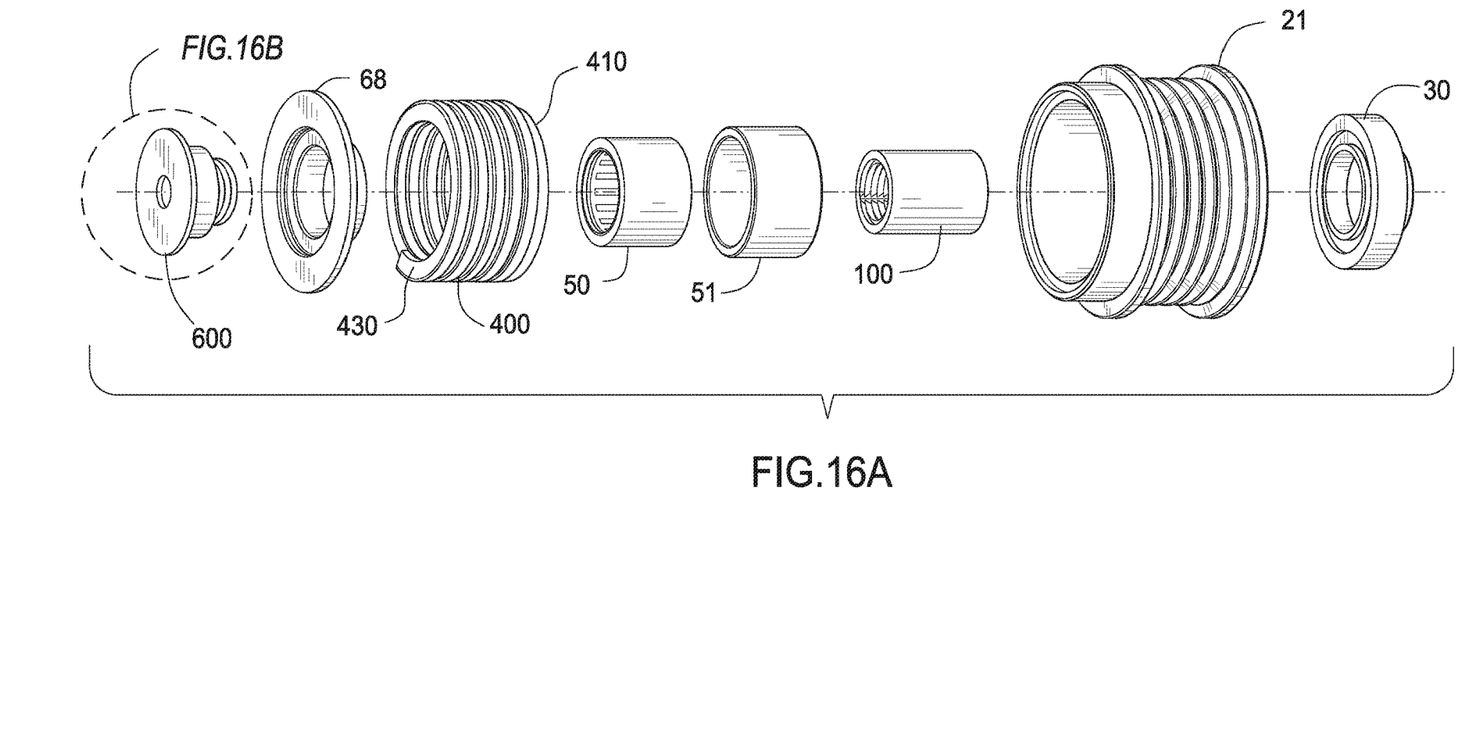
FIG. 16A is an exploded view of FIG. 15.
Figure 16B:
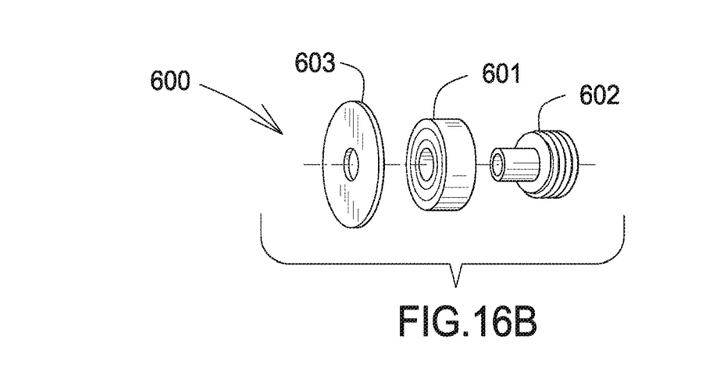
FIG. 16B is a detail of FIG. 16A.

FIG. 16A is an exploded view of FIG. 15. FIG. 16B is a detail of FIG. 16A. Bearing assembly 600 comprises bearing 601, dust cover 603 and threaded projection 602. Threaded projection 602 threads into shaft 100, see FIG. 16.

Figure 17:
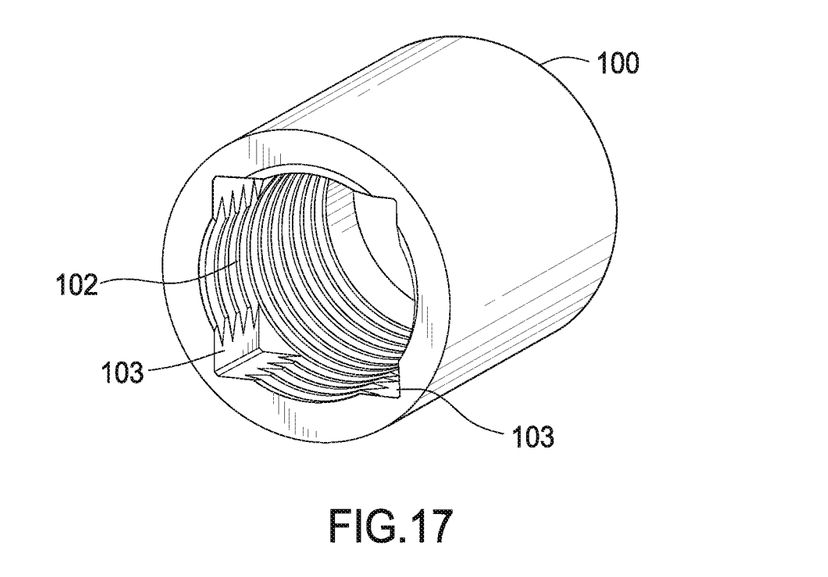
FIG. 17 is a detail of FIG. 16A.

FIG. 17 is a detail of FIG. 16A. Shaft 100 comprises a threaded inner surface 102. When connected to an installation tool, receiving portion 103 temporarily holds shaft 100 as shaft 100 is screwed onto an alternator shaft (not shown) via threaded portion 102.

Figure 18:
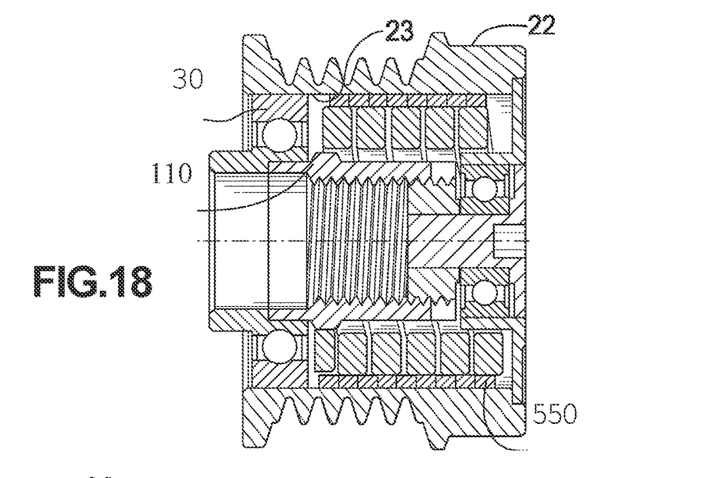
FIG. 18 is a cross-section view of a fourth embodiment.

FIG. 18 is a cross-section view of a fourth embodiment. This embodiment comprises shaft 110, pulley 22, ball bearing 30, torsion spring 500, one-way clutch wrap spring 550 and bearing assembly 700. Ball bearing 30 may also comprise a needle bearing.

Pulley 22 is journalled to shaft 110 through bearing 30 and bearing 701. Torsion spring 500 is engaged between shaft 110 and one-way clutch wrap spring 51.

Torsion spring 500 is welded to a shoulder 112 on shaft 110. The other end of torsion spring 40 is welded to wrap spring 550.

In operation torsion spring 500 is loaded in the winding direction. This causes spring 500 to radially contract under load. Wrap spring 550 radially expands under load, thereby pressing into inner surface 23.

An end 501 of torsion spring 500 is welded to an end of wrap spring 550. The weld may be accomplished using methods known in the welding arts such as MIG, SMAW, GMAW, TIG and laser welding.

Figure 19:
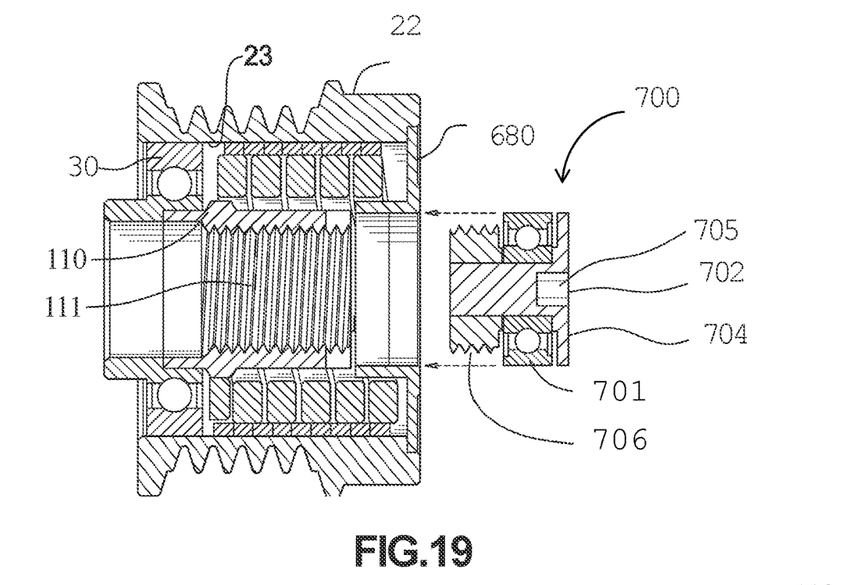
FIG. 19 is a cross-section view of the embodiment in FIG. 18.

FIG. 19 is a cross-section view of the embodiment in FIG. 18. Bearing assembly 700 comprises a bearing 701 and carrier 702. Portion 704 comprises a dust cover. Bearing 701 is press fit onto carrier 702. One end of carrier 702 comprises threaded projection 704. Threaded projection 704 engages threaded receiver 111 of shaft 110. A tool such as a ratchet (not shown) can engage portion 705 to screw bearing assembly 700 into shaft 110.

Figure 20:
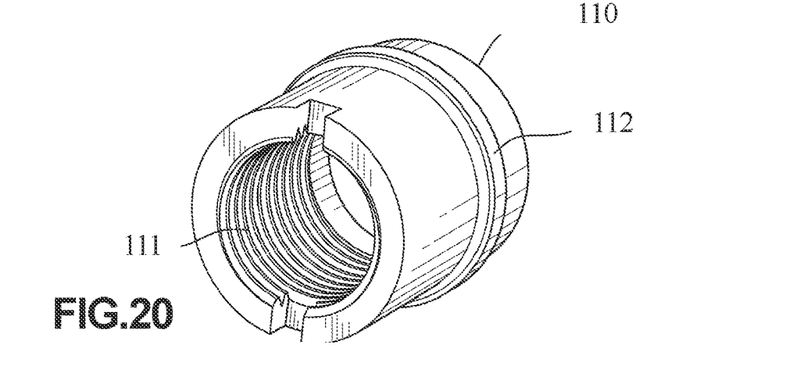
FIG. 20 is a detail of FIG. 18.

FIG. 20 is a detail of FIG. 18. Shaft 110 comprises a shoulder 112. Shoulder 112 projects radially from shaft 110. An end of torsion spring 500 is welded to shoulder 112. The weld may be accomplished using methods known in the welding arts such as MIG, SMAW, GMAW, TIG and laser welding. Inner surface 111 is threaded to receive threaded projection 704.

Figure 21:
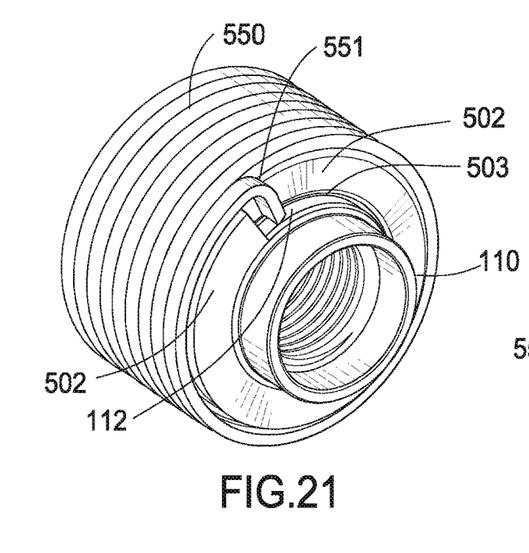
FIG. 21 is a perspective view.

FIG. 21 is a perspective view. End 552 of wrap spring 550 engages an end 503 of spring 500. In an overtorque condition end 502 presses against end 551 thereby causing wrap spring to wind up. As wrap spring winds it contracts inward in the radial direction. This causes wrap spring 550 to progressively loose frictional engagement with surface 23, thereby releasing shaft 110 to rotate with respect to pulley 22. This relieves the overtorque condition thereby preventing damage to the device.

Figure 22:
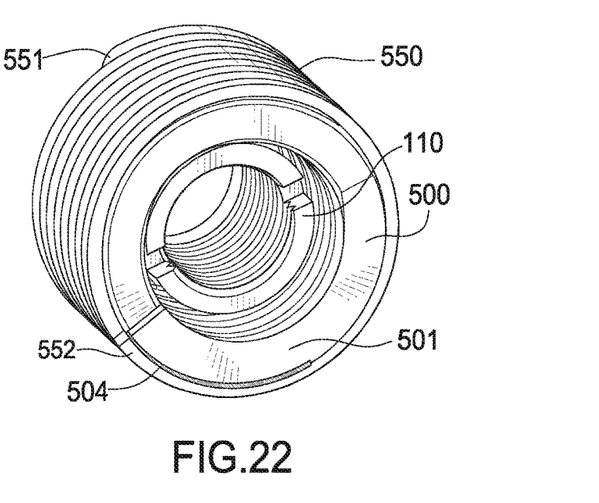
FIG. 22 is a perspective view of a weld detail.

FIG. 22 is a perspective view of a weld detail. End 501 of spring 500 is welded to end 552 of wrap spring 550 with a weld bead 504. Weld 504 may be accomplished using methods known in the welding arts such as MIG, SMAW, GMAW, TIG and laser welding.

Figure 23:
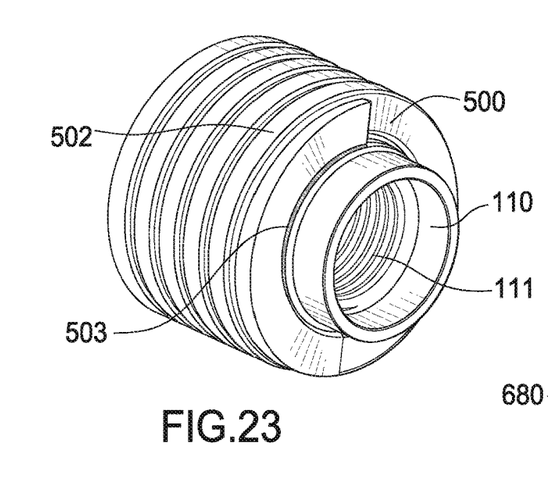
FIG. 23 is a perspective view of a weld detail.

FIG. 23 is a perspective view of a weld detail. End 502 of spring 500 is welded to shoulder 112 with a weld bead 503. Weld 503 may be accomplished using methods known in the welding arts such as MIG, SMAW, GMAW, TIG and laser welding.

Figure 24:
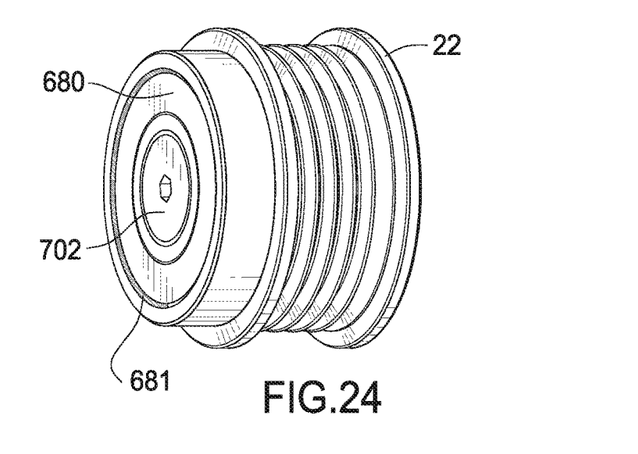
FIG. 24 is a perspective view of a weld detail.

FIG. 24 is a perspective view of a weld detail. Flange 680 is welded to pulley 22 with a weld bead 681. Weld 681 may be accomplished using methods known in the welding arts such as MIG, SMAW, GMAW, TIG and laser welding.

Figure 25A:
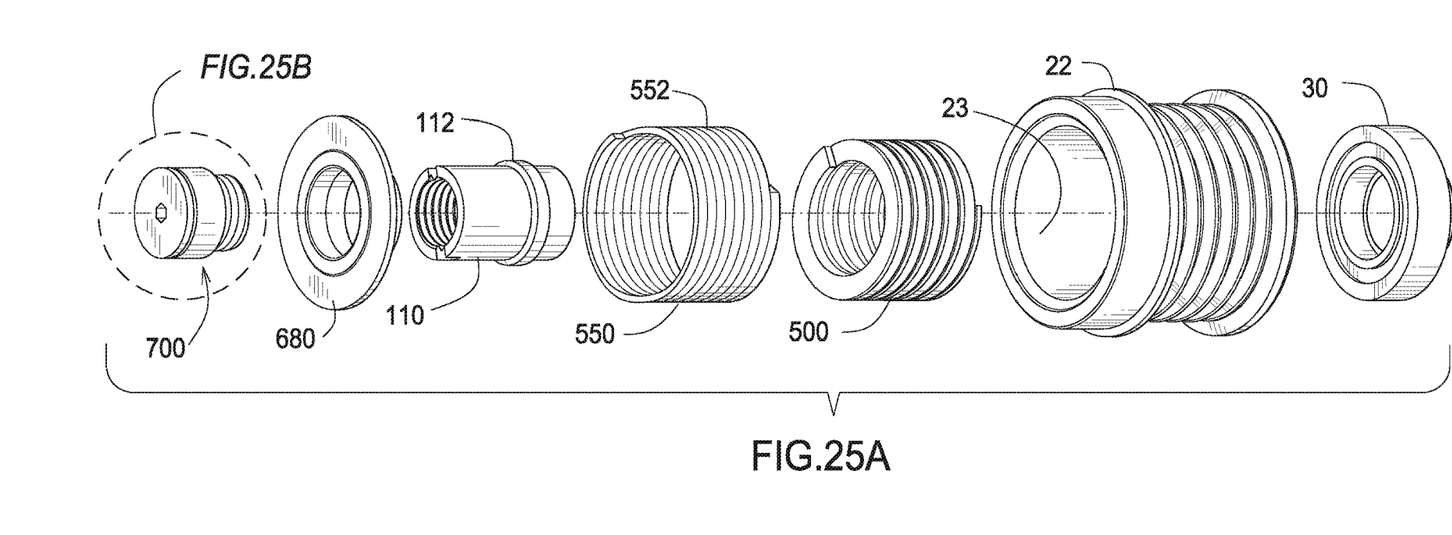
FIG. 25A is an exploded view of FIG. 18.
Figure 25B:
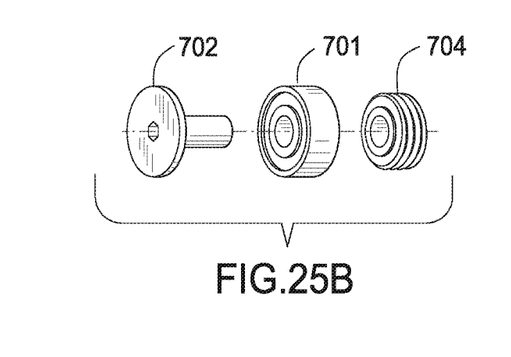
FIG. 25B is a detail of FIG. 25A.

FIG. 25 is an exploded view of FIG. 18. Outer surface 552 frictionally engages surface 23. This prevents rotation of pulley 22 with respect to shaft 110.

In each of the foregoing embodiments, one or more of the described welds can be replaced by a suitable adhesive system. For example, structural adhesive pastes and epoxies, all for metal to metal bonding can be used. Each of these categories is known in the aircraft and aerospace industries, for example, such products are available from 3M®, Permabond and Masterbond and others. Friction welding is also available for use on the welded connections between the shaft and torsion spring.

An isolating decoupler comprising a shaft having a threaded inner surface, a pulley journalled to the shaft on a bearing assembly, the bearing assembly comprising a bearing carrier and a bearing, the bearing carrier threadably engaged with the threaded inner surface, the bearing carrier having a receiving portion for engaging a tool, a one-way clutch engaged with the shaft, a torsion spring engaged between the one-way clutch and the pulley, and the torsion spring having an end welded to the one-way clutch and having another end welded to the pulley.

An isolating decoupler comprising a shaft, a pulley journalled to the shaft on at least one bearing, a one-way clutch engaged with the shaft, a torsion spring engaged between the one-way clutch and the pulley, the shaft configured as an inner race of the at least one bearing, and at least one end of the torsion spring is connected by welding to either the one-way clutch or the pulley.

Although forms of the invention have been described herein, it will be obvious to those skilled in the art that variations may be made in the construction and relation of parts without departing from the spirit and scope of the invention described herein. Unless otherwise specifically noted, components depicted in the drawings are not drawn to scale. Further, it is not intended that any of the appended claims or claim elements invoke 35 U.S.C. § 112(f) unless the words "means for" or "step for" are explicitly used in the particular claim. The present disclosure should in no way be limited to the exemplary embodiments or numerical dimensions illustrated in the drawings and described herein.

We claim:

1. An isolating decoupler comprising:
   a shaft;
   a pulley journalled to the shaft on at least one bearing;
   a one-way clutch engaged with the shaft;
   a torsion spring engaged between the one-way clutch and the pulley;
   the shaft comprises an inner race of the at least one bearing; and
   the torsion spring having a first end welded to the one-way clutch and having a second end welded to the pulley.

2. The isolating decoupler as in claim 1, wherein the at least one bearing is a ball bearing.

3. The isolating decoupler as in claim 1, further comprising a clutch carrier disposed between the torsion spring and the one-way clutch.

4. The isolating decoupler as in claim 1 further comprising a second bearing.

5. The isolating decoupler as in claim 1 further comprising an outer race of the at least one bearing, wherein the outer race comprises a radially extending flange; wherein the flange is disposed between the at least one bearing and the pulley, the torsion spring welded to the flange.

6. The isolating decoupler as in claim 1, wherein the shaft comprises an anti-rotation feature.

7. The isolating decoupler as in claim 1 further comprising a second bearing.

8. The isolating decoupler as in claim 7, wherein the second bearing comprises a ball bearing.

9. An isolating decoupler comprising:
   a shaft;
   a pulley journalled to the shaft on at least one bearing;
   a one-way clutch engaged with the shaft;
   a torsion spring engaged between the one-way clutch and the pulley;
   the shaft configured as an inner race of the at least one bearing; and
   the torsion spring having a first end attached to the one-way clutch and having a second end attached to the pulley.

* * * * *